(12) United States Patent
Park et al.

(10) Patent No.: US 12,072,511 B2
(45) Date of Patent: Aug. 27, 2024

(54) META-LENS, IMAGE CAPTURING LENS INCLUDING THE META-LENS, IMAGE CAPTURING DEVICE INCLUDING THE IMAGE CAPTURING LENS, AND ELECTRONIC APPARATUS INCLUDING THE IMAGE CAPTURING DEVICE

(71) Applicant: SAMSUNG ELECTRONICS CO., LTD., Suwon-si (KR)

(72) Inventors: Hyeonsoo Park, Seoul (KR); Hyunsung Park, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 414 days.

(21) Appl. No.: 17/117,364

(22) Filed: Dec. 10, 2020

(65) Prior Publication Data

US 2021/0247549 A1 Aug. 12, 2021

Related U.S. Application Data

(60) Provisional application No. 62/971,588, filed on Feb. 7, 2020.

(30) Foreign Application Priority Data

Jul. 14, 2020 (KR) .................. 10-2020-0086919

(51) Int. Cl.
*G02B 3/00* (2006.01)
*G02B 1/00* (2006.01)
*G02B 1/18* (2015.01)

(52) U.S. Cl.
CPC ............... *G02B 3/00* (2013.01); *G02B 1/002* (2013.01); *G02B 1/18* (2015.01); *G02B 2207/101* (2013.01)

(58) Field of Classification Search
CPC .... G02B 1/002; G02B 1/18; G02B 2207/101; G02B 3/00; G02B 1/00; G02B 5/00;
(Continued)

(56) References Cited

U.S. PATENT DOCUMENTS 10,488,651 B2 * 11/2019 Kamali ............... G02B 5/0268
10,790,325 B2 * 9/2020 Arbabi .............. H01L 27/14621
(Continued)

FOREIGN PATENT DOCUMENTS

JP 2019-516128 A 6/2019
WO 2018/218063 A1 11/2018

OTHER PUBLICATIONS

Communication dated Jun. 12, 2024 from the Korean Patent Office in Korean Patent Application No. 10-2020-0086919.
(Continued)

*Primary Examiner* — Cara E Rakowski
(74) *Attorney, Agent, or Firm* — Sughrue Mion, PLLC

(57) ABSTRACT

A meta-lens includes a first region including a plurality of first nanostructures two-dimensionally arranged in a circumferential direction and a radial direction based on a center point and distributed according to a first rule; and a plurality of second regions surrounding the first region and including a plurality of second nanostructures two-dimensionally arranged in the circumferential direction and the radial direction based on the center point and distributed according to a second rule, wherein a section satisfying $\Delta w \times \Delta p > 0$ and a section satisfying $\Delta w \times \Delta p < 0$ coexist is formed in the first region and any one of the plurality of second regions, w denoting a width of each of the plurality of first nanostructures or the plurality of second nanostructures and p denoting an arrangement interval in the circumferential direction between the plurality of first nanostructures or the plurality of second nanostructures.

23 Claims, 14 Drawing Sheets

(58) Field of Classification Search
CPC .......... G02B 7/00; G02B 13/00; G02B 15/00; G02B 17/00; G02B 19/00; G02B 21/00; G02B 23/00; G02B 25/00; G02B 26/00; G02B 27/00; G02B 30/00; G02B 2207/00; B82Y 20/00
See application file for complete search history.

(56) References Cited

U.S. PATENT DOCUMENTS

| | | |
|---|---|---|
| 11,092,717 B2 | 8/2021 | Capasso et al. |
| 2014/0044392 A1 | 2/2014 | Fattal et al. |
| 2014/0277433 A1 | 9/2014 | Pugh et al. |
| 2017/0034500 A1* | 2/2017 | Arbabi .............. H01L 27/14605 |
| 2017/0082263 A1* | 3/2017 | Byrnes ...................... F21K 9/64 |
| 2017/0212285 A1 | 7/2017 | Arbabi et al. |
| 2019/0033683 A1 | 1/2019 | Ahmed et al. |
| 2019/0139243 A1 | 5/2019 | You et al. |
| 2019/0309925 A1 | 10/2019 | Keh et al. |
| 2020/0096672 A1 | 3/2020 | Yu et al. |
| 2020/0174163 A1* | 6/2020 | Han ...................... G02B 5/189 |

OTHER PUBLICATIONS

Mao Ye et al., "Linear polarization distinguishing metalens in visible wavelength", Optics Letters, 2019, vol. 44, No. 2, pp. 399-402 (4 pages total).

\* cited by examiner

META-LENS, IMAGE CAPTURING LENS INCLUDING THE META-LENS, IMAGE CAPTURING DEVICE INCLUDING THE IMAGE CAPTURING LENS, AND ELECTRONIC APPARATUS INCLUDING THE IMAGE CAPTURING DEVICE

CROSS-REFERENCE TO RELATED APPLICATIONS

This application is based on and claims priority under 35 U.S.C. § 119 to U.S. Provisional Application No. 62/971,588, filed on Feb. 7, 2020, in the U.S. Patent and Trademark Office, and to Korean Patent Application No. 10-2020-0086919, filed on Jul. 14, 2020, in the Korean Intellectual Property Office, the disclosures of which are incorporated by reference herein in their entireties.

BACKGROUND

1. Field

Example embodiments of the disclosure relate to meta-lenses, image capturing lenses including the meta-lens, image capturing devices including the image capturing lens, and electronic apparatuses including the image capturing device.

2. Description of Related Art

Optical sensors using a semiconductor-based sensor array have been increasingly used in mobile devices and wearable devices, such as Internet of Things devices, etc.

Miniaturization of these devices is required, but it is difficult to reduce the thickness of optical lenses included in these devices. With regard to a lens that controls optical performance according to a curvature of the lens, the refractive power of the lens increases as the radius of curvature decreases. This is because the thickness of the lens in an optical axis direction increases as the radius of curvature decreases.

Accordingly, attempts have been made to implement a flat and thin lens based on a meta-surface. However, increasing the reliability of a wideband operation performance of a meta-surface-based lens is still difficult.

SUMMARY

Provided are meta-lenses with improved optical performance in a wide wavelength bandwidth.

Provided are image capturing lenses including a meta-lens with improved optical performance in a wide wavelength bandwidth Provided are image capturing devices including an image capturing lens having an improved meta-lens and electronic apparatuses including the image capturing device.

Additional aspects will be set forth in part in the description which follows and, in part, will be apparent from the description, or may be learned by practice of the example embodiments of the disclosure.

According to an aspect of an embodiment, a meta-lens includes:
a first region including a plurality of first nanostructures that are two-dimensionally arranged in a circumferential direction and a radial direction based on a center point, wherein the plurality of first nanostructures are distributed according to a first rule; and a plurality of second regions surrounding the first region and including a plurality of second nanostructures that are two-dimensionally arranged in the circumferential direction and the radial direction based on the center point, wherein the plurality of second nanostructures are distributed according to a second rule.

A region where a section satisfying $\Delta w \times \Delta p > 0$ and a section satisfying $\Delta w \times \Delta p < 0$ coexist is formed and extends in the radial direction in the first region and any one of the plurality of second regions, w denoting a width of each of the plurality of first nanostructures or the plurality of second nanostructures and p denoting an arrangement interval in the circumferential direction between the plurality of first nanostructures or the plurality of second nanostructures.

The plurality of first nanostructures and the plurality of second nanostructures are arranged to have polar symmetry as a whole.

The first rule and the second rule may include a rule according to which
the width w of the plurality of first nanostructures or the plurality of second nanostructures changes in one direction as a distance from the center point increases in the radial direction, and the arrangement interval p in the circumferential direction between the plurality of first nanostructures or the plurality of second nanostructures decreases and then increases away from the center point in the radial direction.

The maximum arrangement interval $p_{max}$ and the minimum arrangement interval $p_{min}$ in the circumferential direction between the plurality of first nanostructures or the plurality of second nanostructures may satisfy the following condition:

$$p_{max} - p_{min} > 0.2 \times p_{max}.$$

The first rule and the second rule may include a rule according to which
the arrangement intervals p in the circumferential direction of the plurality of nanostructures arranged apart from the center point by a radius of the same size, from among the plurality of first nanostructures or the plurality of second nanostructures, may be the same.

The first rule and the second rule may include a rule according to which
the widths w of the plurality of nanostructures arranged apart from the center point by a radius of the same size among the plurality of first nanostructures or the plurality of second nanostructures may be the same.

When an arrangement interval in the circumferential direction of the plurality of nanostructures positioned at a first radius r1 is p1 and an arrangement interval in the circumferential direction of the plurality of nanostructures positioned at a second radius r2 adjacent to the first radius r1 in a direction away from the center point in the radial direction is p2, one of the following two conditions may be satisfied.

$$r_2 - r_1 = (p_1 + p_2)/2$$

or $$r_2 - r_1 = \{(p_1 + p_2)/2\} \cdot (3/2)$$

A target phase change range with respect to light of a predetermined wavelength band incident on the meta-lens in each of the first region and the plurality of second regions may be 0 to $2\pi$.

The predetermined wavelength band of light may include a visible light wavelength band.

The first region may have a circular shape, and the plurality of second regions may have a concentric ring shape.

A width of the first region and the plurality of second regions in the radial direction may decrease as a distance from the center point increases in the radial direction.

The meta-lens may further include a substrate on which the plurality of first nanostructures and the plurality of second nanostructures are provided, wherein the plurality of first nanostructures and the plurality of second nanostructures may include a material having a refractive index greater than that of the substrate.

A difference between the refractive index of the substrate and the refractive index of the plurality of first and second nanostructures may be greater than or equal to about 0.4 and less than or equal to about 3.

The meta-lens may further include a protective layer covering the substrate and the plurality of first and second nanostructures.

A difference between the refractive index of the protective layer and the refractive index of the plurality of first and second nanostructures may be greater than or equal to about 0.4 and less than or equal to about 3.

When the refractive index and height of the plurality of first and second nanostructures are respectively $n_{post}$ and h, the refractive index of the protective layer is $n_{clad}$, and the center wavelength of a predetermined wavelength band of light incident on the meta-lens is $\lambda$, the following condition may be satisfied.

$$3/2*\lambda/(n_{post}-n_{clad}) \leq h$$

When an arrangement interval in the circumferential direction between the plurality of first nanostructures or the plurality of second nanostructures is p, the following condition may be satisfied.

$$p < \lambda/2$$

Heights of the plurality of first nanostructures and the plurality of second nanostructures may be different in at least two regions of the first region and the plurality of second regions.

A fill factor of each of the plurality of first nanostructures or the plurality of second nanostructures with respect to a unit region having a width equal to an arrangement interval p in the circumferential direction between the plurality of first nanostructures or the plurality of second nanostructures may be in a range of about 25% to about 60%.

A cross-section of the plurality of first nanostructures or the plurality of second nanostructures may have symmetric shape.

According to an aspect of an embodiment, an image capturing lens includes:

the meta-lens described above and at least one refractive lens having a light incident surface and a light exit surface, and at least one of the light incident surface and the light exit surface is a curved surface.

According to an aspect of an embodiment, an image capturing device includes:

the image capturing lens described above and an image sensor that converts an optical image formed by the image capturing lens into an electrical signal.

According to an aspect of an embodiment, an electronic apparatus includes:

the image capturing device described above and a processor configured to control an operation of the image capturing device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
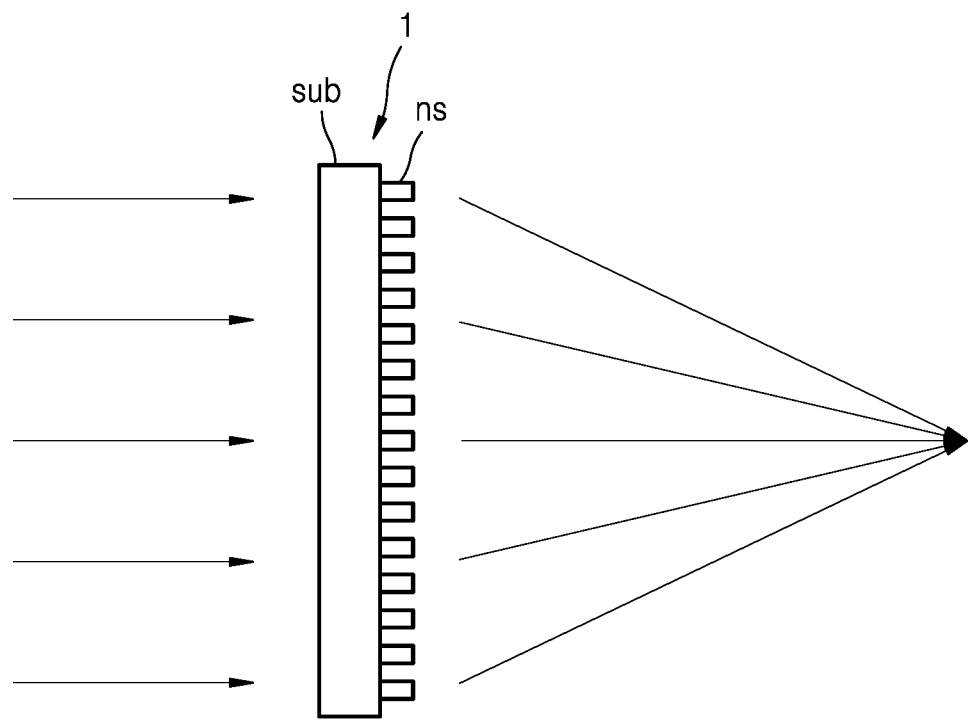
FIG. 1 is a schematic side view of a configuration of a meta-lens according to a comparative example.

Reference will now be made in detail to example embodiments, examples of which are illustrated in the accompanying drawings, wherein like reference numerals refer to like elements throughout. The embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a meta-lens, an image capturing lens including the meta-lens, an image capturing device including the image capturing lens, and an electronic apparatus including the image capturing device according to example embodiments will be described in detail with reference to the accompanying drawings. In the drawings, sizes or thicknesses of constituent elements may be exaggerated for clarity and convenience of explanation. The following embodiments described below are merely illustrative, and various modifications may be possible from the embodiments of the disclosure.

It will be understood that when an element or layer is referred to as being "on" or "above" another element or layer, the element or layer may be directly on another element or layer or intervening elements or layers. As used herein, the singular forms "a," "an" and "the" are intended to include the plural forms as well, unless the context clearly indicates otherwise. It should be understood that, when a part "comprises" or "includes" an element in the specification, unless otherwise defined, other elements are not excluded from the part and the part may further include other elements The term "above" and similar directional terms may be applied to both singular and plural. With respect to operations that constitute a method, the operations may be performed in any appropriate sequence unless the sequence of operations is clearly described or unless the context clearly indicates otherwise. The operations may not necessarily be performed in the order of sequence.

It will be understood that, although the terms "first", "second", etc. may be used herein to describe various elements, the elements should not be limited by these terms. These terms are only used to distinguish one element from another element.

When nanostructures NS (refer to FIG. 6) are arranged so that a meta-lens 100 (refer to FIG. 4) according to an embodiment performs as a lens that shows refractive power with respect to light in a wide wavelength band of visible light, there may be a limit in controlling an aberration, etc. in an arrangement based on orthogonal coordinates. The meta-lens 100 has a desired performance with respect to light in a wide wavelength band by using a rule based on polar coordinates in determining the size and/or shape according to the location of the nanostructure NS, and also, the performance may be obtained with a possible single-layer nanostructure NS arrangement.

Each position of the plurality of nanostructures NS may be expressed as a coordinate (r, θ), wherein the center of the arrangement of the plurality of nanostructures NS, that is, the center of the meta-lens 100, is an origin, r represents a distance in a radial direction away from the origin on a plane parallel to the meta-lens 100, and θ represents a rotation angle of a reference line on the plane with respect to a normal line as a rotational axis from the origin. In the drawing, the normal line direction is a Z direction, and the reference line direction is an X direction. A shape dimension of the nanostructure NS at a position (r, θ) may be determined in a relationship between r and θ, and, for example, may be expressed as a function of r and/or θ. Hereinafter, the meta-lens 100 that operates with respect to light of a wide wavelength band through controlling a width w and an arrangement gap p according to (r, θ) positions of the plurality of nanostructures NS based on polar coordinates will be described in detail.

Figure 2:
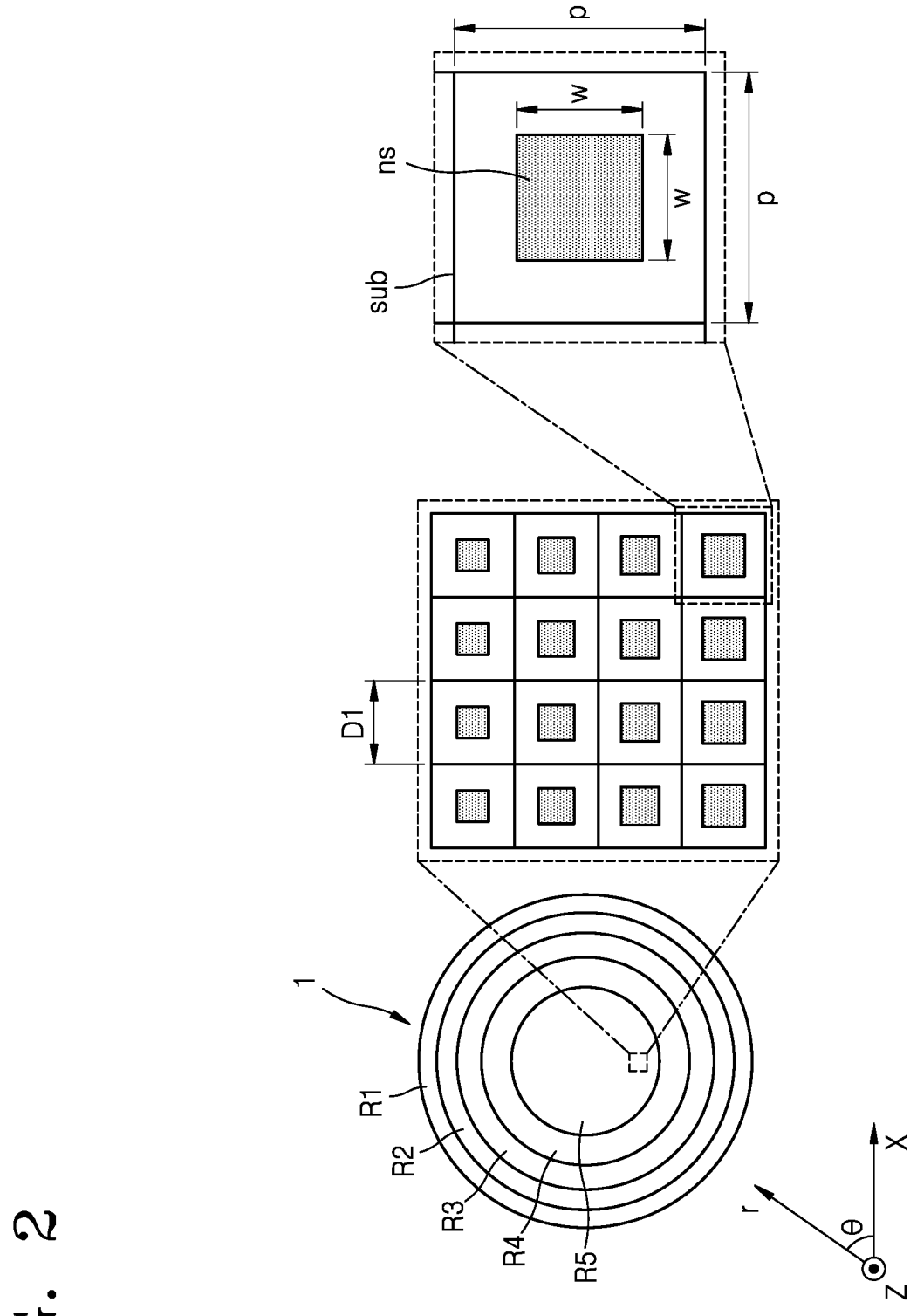
FIG. 2 is a schematic plan view of a configuration of a meta-lens according to a comparative example.
Figure 3:
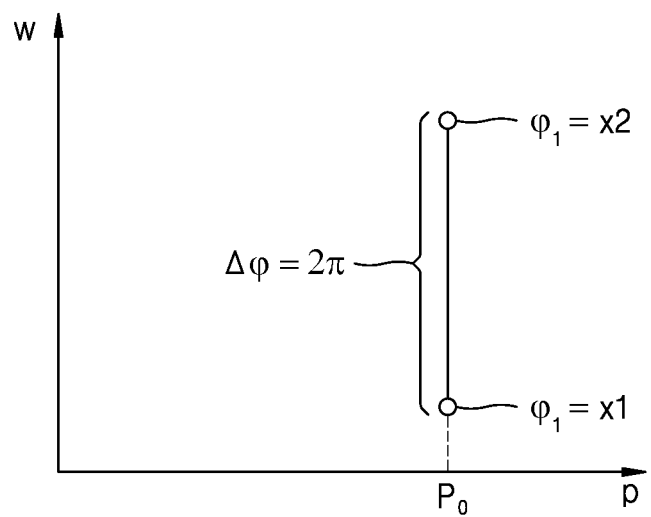
FIG. 3 is a graph briefly showing parameters of a plurality of nanostructures included in a meta-lens according to a comparative example.

FIG. 1 is a schematic side view of a configuration of a meta-lens 1 according to a comparative example; FIG. 2 is a schematic plan view of a configuration of the meta-lens 1 according to a comparative example; FIG. 3 is a graph briefly showing parameters of a plurality of nanostructures included in the meta-lens 1 according to a comparative example;

Referring to FIG. 1, the meta-lens 1 according to a comparative example may have the same function as a convex lens. For example, the meta-lens 1 may focus incident light to a point by refracting the incident light. The meta-lens 1 may include a plurality of nanostructures ns provided on a substrate sub. The meta-lens 1 may function as a convex lens by controlling the shape, arrangement distribution, etc. of the plurality of nanostructures ns. However, the meta-lens 1 is not limited thereto, and the meta-lens 1 may have the same function as a concave lens by controlling the shape and arrangement distribution of the plurality of nanostructures ns.

The plurality of nanostructures ns may have a shape dimension of a sub-wavelength. Here, the shape dimension of the sub-wavelength denotes a shape dimension less than the center wavelength λ of a predetermined wavelength band when a plurality of nanostructures (ns) are arranged to perform a desired optical function for light in the predetermined wavelength band.

Referring to FIG. 2, the meta-lens 1 includes a central region R5 including a plurality of nanostructures ns two-dimensionally arranged in a circumferential direction r and a radial direction θ with respect to the center point and includes a plurality of annular regions R1, R2, R3, and R4 including a plurality of nanostructures ns that surround the central region R5 and are two-dimensionally arranged in the circumferential direction and the radial direction. The central region R5 and the plurality of annular regions R1, R2, R3, and R4 may include a plurality of nanostructures ns distributed according to an independent rule applied to each region. The independent rules applied to the central region R5 and the plurality of annular regions R1, R2, R3, and R4 may be different from each other or the same.

A target phase $\varphi_{target}$ may be set for each of the central region R5 and the plurality of annular regions R1, R2, R3, and R4. The target phase $\varphi_{target}$ may be set to represent a phase change range of 0 to $2\pi$ in a radial direction within a given region, and the central region R5 and the plurality of annular regions R1, R2, R3, and R4 may be referred to as a '$2\pi$ zone'. The lens operation characteristics of the meta-lens 1 may be well displayed when the target phase range for incident light of the central region R5 and the plurality of annular regions R1, R2, R3, and R4 is 0 to $2\pi$. For example, the meta-lens 1 may operate as a lens having refractive power only when the target phase range for incident light of the central region R5 and the plurality of annular regions R1, R2, R3, and R4 is 0 to $2\pi$.

The plurality of nanostructures ns may be two-dimensionally arranged on the substrate sub by being spaced apart from each other with the same arrangement distance D1 in the circumferential direction. Each of the plurality of nanostructures ns may include a square column having a width w. However, the meta-lens 1 is not limited thereto, and each of the plurality of nanostructures ns may include various shapes other than a square column. For example, the plurality of nanostructures ns may include a pentagonal column, a hexagonal column, a cylinder, etc. As shown in FIG. 2, when the plurality of nanostructures ns include a square column having a width w, a fill factor of the plurality of nanostructures ns for a unit region having a width equal to the arrangement distance p between the plurality of nanostructures ns in the circumferential direction may be defined as '$w^2/p^2$'. Also, for example, when the plurality of nanostructures ns includes a cylinder having a diameter w, the fill factor of the plurality of nanostructures ns may be defined as '$\pi \times (w/2)^2 / p^2$'.

Referring to FIG. 3, the distribution rule of the plurality of nanostructures ns applicable to any one of the central region R5 and the plurality of annular regions R1, R2, R3, and R4 may include a rule for changing the width w of each of the plurality of nanostructures ns for each position in the radial direction while keeping the arrangement interval of the plurality of nanostructures ns in the circumferential direction constant at $P_0$. At this point, a change range of the width w of each of the plurality of nanostructures ns may be selected so that a phase change range $\Delta \varphi$ with respect to the center frequency of light in a predetermined wavelength band in the radial direction is 0 to $2\pi$.

Meanwhile, a phase delay function $\varphi(\omega)$ with respect to a frequency of incident light in a predetermined wavelength band may be developed as Equation 1 below.

$$\phi(\omega) = \frac{2\pi h}{c} \omega n_{eff}(\omega) = \phi_0 + \phi_1 \left( \frac{\omega}{\omega_0} - 1 \right) + \phi_2 \left( \frac{\omega}{\omega_0} - 1 \right)^2 + \dots . \quad \text{(Equation 1)}$$

Here, $\omega_0$ represents the center frequency of incident light in a predetermined wavelength band, h represents the height of the nanostructure ns, c represents the speed of light, and $n_{eff}(\omega)$ represents the effective refractive index of the nanostructure ns. Furthermore, '$\varphi_0, \varphi_1, \varphi_2 \ldots$' are coefficients that affect the phase delay of incident light. Among them, $\varphi_0$ denotes the center phase delay value. According to Equation 1, the phase change value for light incident to the same nanostructure ns may vary according to the frequency of incident light. In this case, among a plurality of coefficients included in the phase delay function $\varphi(\omega)$, a linear term coefficient $\varphi_1$ may greatly influence on the phase change value than the coefficients of other higher order terms.

Referring back to FIG. 3, the plurality of nanostructures ns included in any one of the central region R5 and the plurality of annular regions R1, R2, R3, and R4 may have the same arrangement interval $P_0$ in the circumferential direction, and may have different widths w from each other for each position in the radial direction. The phase delay function $\varphi(\omega)$ of the plurality of nanostructures ns having different widths w may have different linear term coefficients φ1 from each other. For example, a linear term coefficient $\varphi_1$ of any one of arbitrary two nanostructures ns having the same arrangement interval $P_0$ in the circumferential direction, but provided at different positions in the radial direction and having different widths w may have a value of x1 and the other linear term coefficient $\varphi_1$ may have a value of x2 different from x1. In this case, the phase delay range may be 0 to $2\pi$ for the center frequency of light in the predetermined wavelength band, but, with respect to frequencies other than the center frequency of light in the predetermined wavelength band, the phase delay range may be changed depending on a frequency. Accordingly, the meta-lens 1 according to a comparative example may not be suitable for operating on light of a wide wavelength band.

Figure 4:
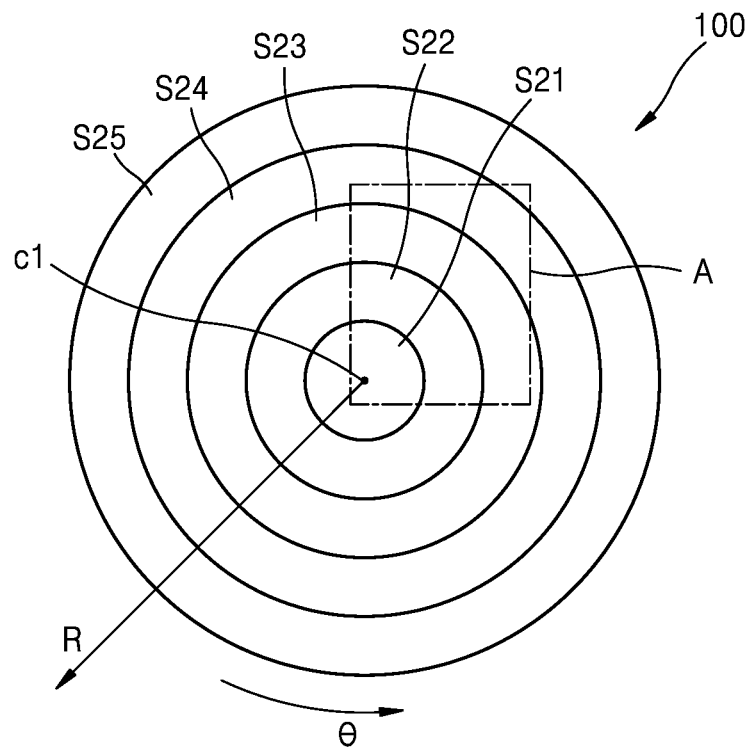
FIG. 4 is a schematic plan view of a configuration of a meta-lens according to an embodiment.
Figure 5:
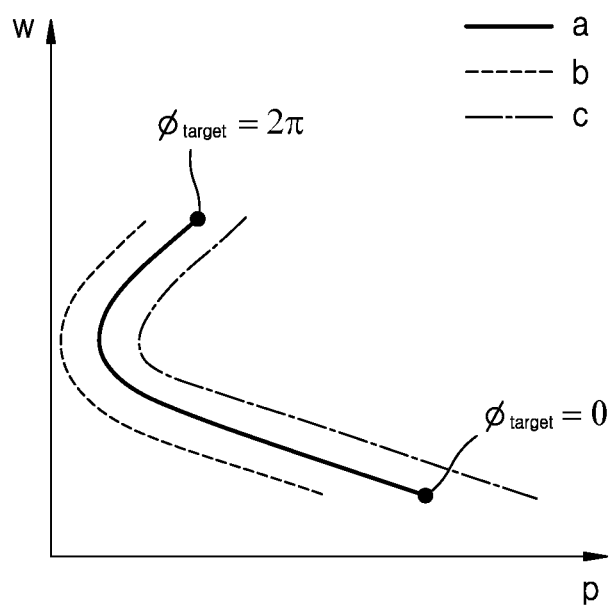
FIG. 5 is a graph briefly showing parameters of a plurality of nanostructures included in the meta-lens of FIG. 4 according to an embodiment.
Figure 6:
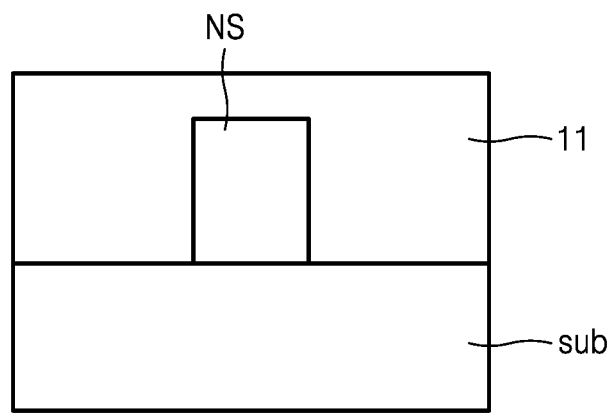
FIG. 6 is a schematic diagram of a configuration of a plurality of nanostructures included in a meta-lens according to an embodiment.
Figure 7:
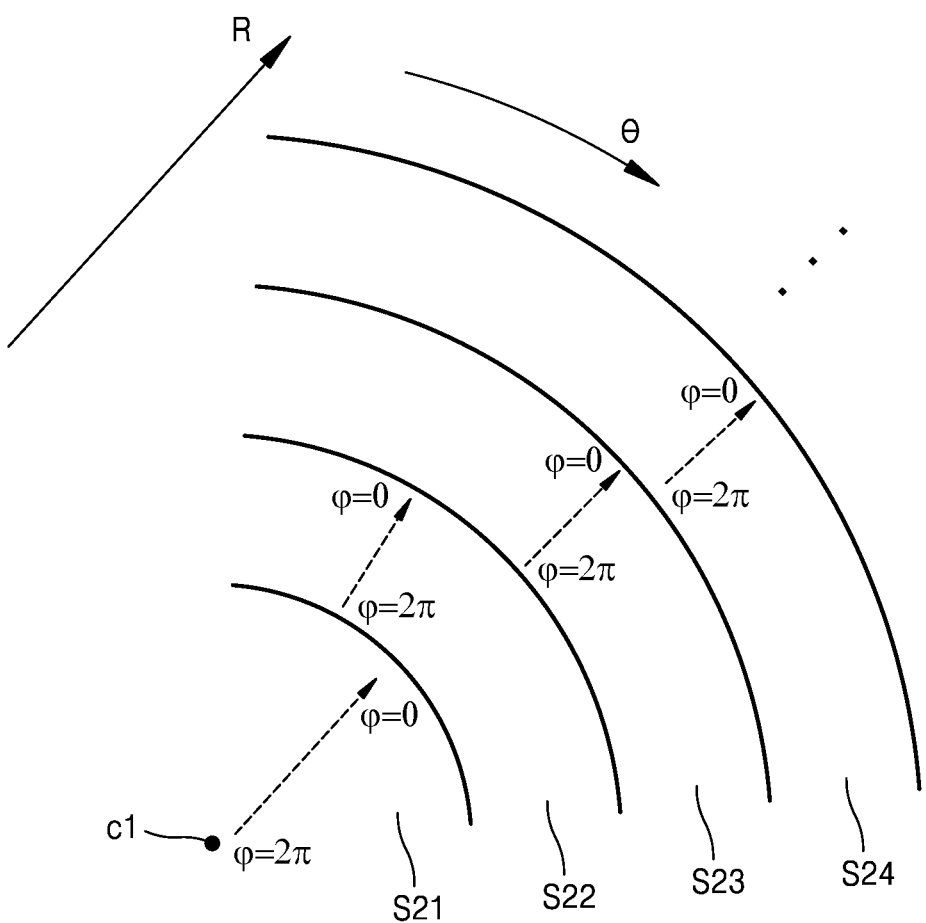
FIG. 7 is a schematic diagram of a target phase change range with respect to incident light of a meta-lens according to an embodiment.
Figure 8:
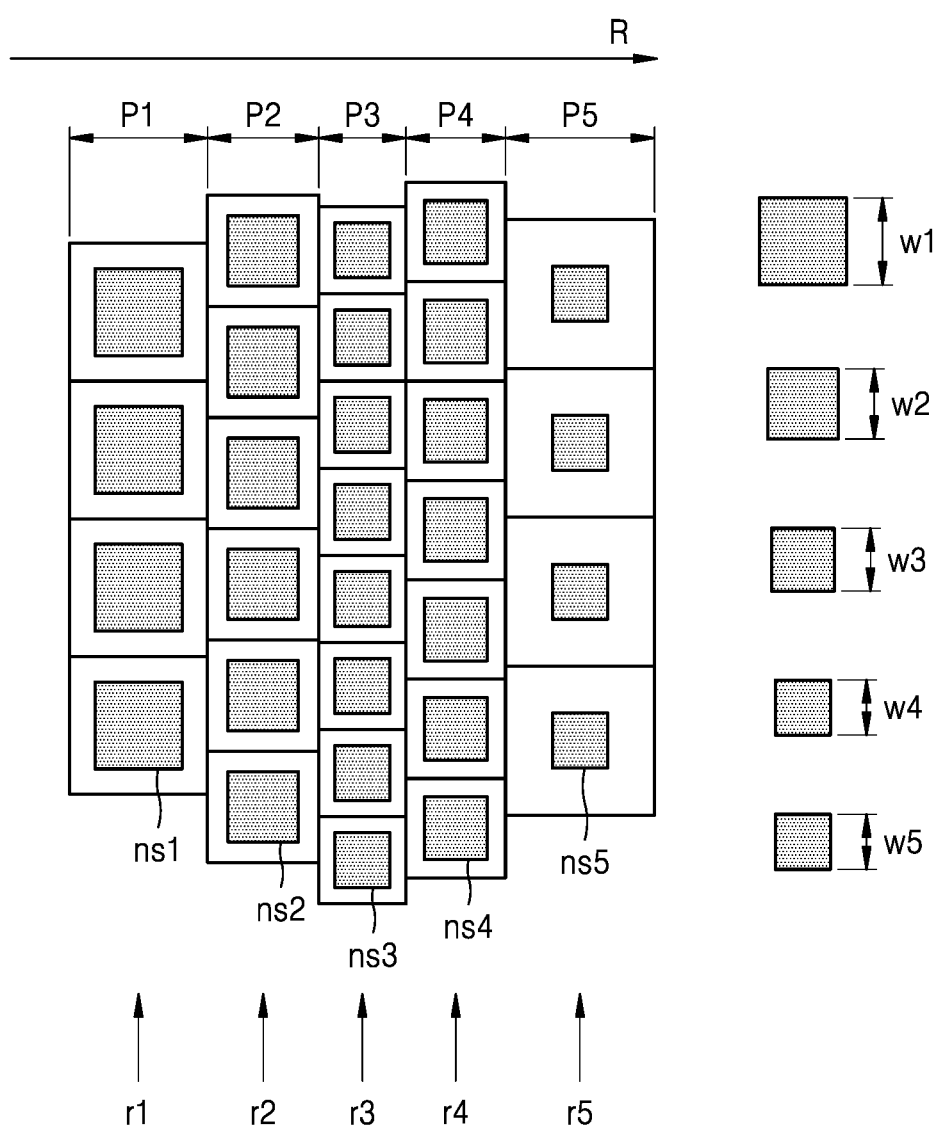
FIG. 8 is a schematic plan view of an arrangement of a plurality of nanostructures applicable to the meta-lens of FIG. 4 according to an embodiment.
Figure 9:
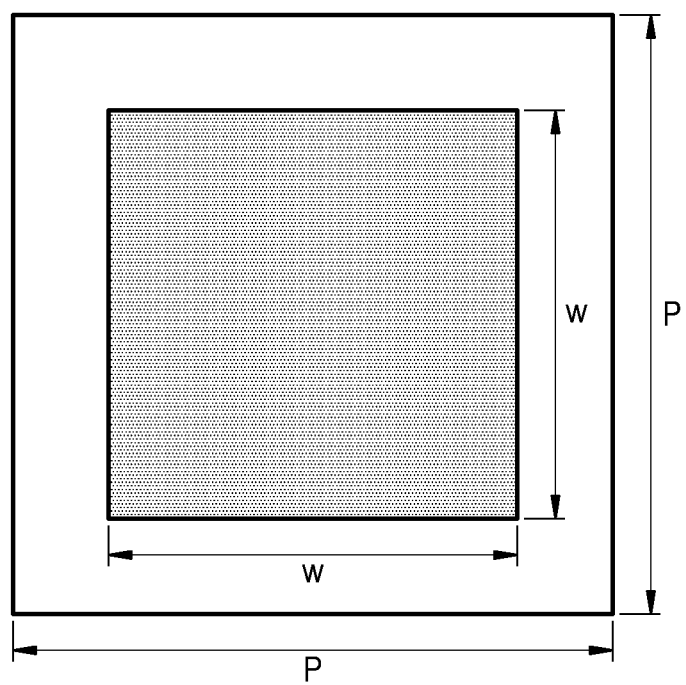
FIG. 9 is a schematic plan view of a structure of a plurality of nanostructures applicable to the meta-lens of FIG. 4 according to an embodiment.

FIG. 4 is a schematic plan view of a configuration of a meta-lens 100 according to an embodiment. FIG. 5 is a graph briefly showing parameters of a plurality of nanostructures NS included in the meta-lens 100 of FIG. 4. FIG. 6 is a schematic diagram of a configuration of a plurality of nanostructures NS included in the meta-lens 100 according to an embodiment. FIG. 7 is a schematic diagram of a target phase change range with respect to incident light of the meta-lens 100 according to an embodiment. FIG. 8 is a schematic plan view of an arrangement of a plurality of nanostructures ns1, ns2, ns3, ns4, and ns5 applicable to the meta-lens 100 of FIG. 4. FIG. 9 is a schematic plan view of a structure of a plurality of nanostructures NS applicable to the meta-lens 100 of FIG. 4;

Referring to FIG. 4, the meta-lens 100 according to an embodiment may include: a first region S21 that includes a plurality of first nanostructures NS (refer to FIG. 6) two-dimensionally arranged in a circumferential direction θ and a radial direction R with respect to a center point c1, and in which the plurality of first nanostructures NS are distributed according to a first rule; and a plurality of second regions S22, S23, S24, and S25 that surround the first region S21 and include a plurality of second nanostructures NS two dimensionally arranged in the circumferential direction θ and the radial direction R, and in which the plurality of second nanostructures NS are distributed according to a second rule.

When an arrangement interval in the circumferential direction θ between the plurality of first or second nanostructures NS is p, the plurality of first or second nanostructures NS may be arranged to satisfy a condition $p < \lambda/2$. Furthermore, the plurality of first and second nanostructures NS may be arranged to have polar symmetry as a whole. For example, widths and arrangement intervals of the plurality of first or second nanostructures NS provided at a position separated by the same distance from the center point c1 of the meta-lens 100 may be the same.

A target phase $\varphi_{target}$ with respect to incident light of a predetermined wavelength band may be set for each of the first region S21 and the plurality of second regions S22, S23, S24, and S25. The predetermined wavelength band of light may be a visible light wavelength band. The target phase $\varphi_{target}$ may be set to represent a phase change range of 0 to $2\pi$ in the radial direction R within a given region, and the first region S21 and a plurality of second regions S22, S23, S24, S25 may be referred to as a '$2\pi$ zone'. The lens operation characteristics of the meta-lens 100 may be well displayed when the target phase range with respect to light incident to the first region S21 and the plurality of second regions S22, S23, S24, and S25 is 0 to $2\pi$. Widths of the first region S21 and the plurality of second regions S22, S23, S24, S25 in the radial direction R may decrease as a distance from the center point c1 increases in the radial direction R. In this case, the meta-lens 100 may operate as a convex lens. However, the meta-lens 100 is not limited thereto. For example, the widths of the first region S21 and a plurality of second regions S22, S23, S24, and S25 in the radial direction R may increase as a distance from the center point c1 increases in the radial direction R, and in this case, the meta-lens 100 may operate as a concave lens.

The first region S21 may be referred to as a central region of the meta-lens 100 including a plurality of first nanostructures NS that are two-dimensionally arranged in the circumferential direction θ and the radial direction R with respect to the center point c1. For example, the first region S21 may have a circular shape. The plurality of first nanostructures NS included in the first region S21 may be distributed according to the first rule.

When a width of each of the plurality of first nanostructures NS is w and the arrangement interval in the circumferential direction θ between the plurality of first nanostructures NS is p, the first rule may include a rule according to which a region where a section $\Delta w \times \Delta p > 0$ and a section $\Delta w \times \Delta p < 0$ coexist in the first region S21 is formed to extend in the radial direction R. For example, the width w of the plurality of first nanostructures NS may change in one direction (e.g., decrease or increase) as a distance from the center point c1 increases in the radial direction R, and the arrangement interval p between the plurality of first nanostructures NS in the circumferential direction θ may decrease and then increase as the distance from the center point c1 increases in the radial direction R. In this case, it may be said that the arrangement interval p between the plurality of first nanostructures NS in the circumferential direction θ varies with one inflection point. However, the example embodiment is not limited thereto. For example, the arrangement interval p between the plurality of first nanostructures NS in the circumferential direction θ may repeatedly show a tendency of decreasing and then increasing as a distance from the center point c1 increases in the radial direction R. In this case, it may be said that the arrangement interval p between the plurality of first nanostructures NS in the circumferential direction θ varies with two or more inflection points.

The plurality of second regions S22, S23, S24, and S25 surround the first region S21, and may refer to a plurality of annular regions including the plurality of second nanostructures NS that are two-dimensionally arranged in the circumferential direction and the radial direction. For example, the plurality of second regions S22, S23, S24, and S25 may have a concentric ring shape. The plurality of second nanostructures NS included in the second regions S22, S23, S24, and S25 may be distributed according to the second rule.

When a width of each of the plurality of second nanostructures NS is w and the arrangement interval in the circumferential direction θ between the plurality of second nanostructures NS is p, the second rule may include a rule according to which a where a section Δw×Δp>0 and a section Δw×Δp<0 coexist in any one of the areas S22, S23, S24, and S25 is formed to extend in the radial direction R. For example, the width w of the plurality of second nanostructures NS may change in one direction (e.g., decrease or increase) as a distance from the center point c1 increases in the radial direction R, and the arrangement interval p between the plurality of second nanostructures NS in the circumferential direction θ may decrease and then increase as a distance from the center point c1 increases in the radial direction R. In this case, it may be said that the arrangement interval p between the plurality of second nanostructures NS in the circumferential direction θ varies with one inflection point. However, the example embodiment is not limited thereto. For example, the arrangement interval p between the plurality of second nanostructures NS in the circumferential direction θ may repeatedly show a tendency of decrease and then increase as a distance from the center point c1 increases in the radial direction R. In this case, it may be said that the arrangement interval p between the plurality of second nanostructures NS in the circumferential direction θ varies with two or more inflection points.

The tendency of parameter distributions of the plurality of first and second nanostructures NS that follow the first and second rules may be shown in a graph of FIG. 5.

Referring to FIG. 5, the distribution of parameters of a plurality of nanostructures NS that follow the first and second rules applicable to the first and second regions S21, S22, S23, S24, and S25 may be expressed as a first curve a in a graph of the width w with respect to the arrangement interval p of the plurality of nanostructures NS of FIG. 5. The first curve a may have a boomerang or 'U'-shape. For example, when a width w of the plurality of nanostructures NS is changed (e.g., decreased or is increased) in one direction as a distance from the center point c1 increases in the radial direction R, the first curve a may show a tendency in which the arrangement interval p in the circumferential direction θ between the nanostructures NS decreases and then increases as a distance from the center point c1 increases in the radial direction R. In this way, in one of the first and second regions S21, S22, S23, S24, and S25, the plurality of nanostructures NS may be distributed to have a width w that is changed (decreased or increased) in one direction as a distance from the center point c1 increases in the radial direction R and an arrangement interval p that is anomalously changed (e.g., decreased and then increased) in the circumferential direction θ. The parameter distribution of the plurality of nanostructures NS is not limited to the first curve a, and may appear as a boomerang or 'U'-shaped curve having one inflection point similar to the first curve a included between the second curve b and the third curve c.

On the other hand, when the arrangement interval p in the circumferential direction θ between the plurality of nanostructures NS repeatedly shows a tendency of decrease and then increase as a distance from the center point c1 increases in the radial direction R, the distribution of parameters of the plurality of nanostructures NS that may be applied to the first and second regions S21, S22, S23, S24, and S25 may appear as a zigzag-shaped curve having two or more inflection points in the graph of FIG. 5.

Furthermore, an optimal path of a curve on the graph representing the parameter distribution of the plurality of nanostructures NS applied to the first and second regions S21, S22, S23, S24, and S25 may be different for each region. A chief ray angle (CRA) of incident light in a predetermined wavelength band of light incident on the first and second regions S21, S22, S23, S24, and S25 may be different for each region. Accordingly, the parameter distribution of the plurality of nanostructures NS applied to the first and second regions S21, S22, S23, S24, and S25 may be determined differently for each region to have a target phase delay range of 0 to 2π with respect to incident light of a predetermined wavelength band having different central angles from each other.

In addition, the maximum arrangement interval $p_{max}$ and the minimum arrangement interval $p_{min}$ in the circumferential direction θ between the plurality of first nanostructures NS or the plurality of second nanostructures NS in any one of the first and second regions S21, S22, S23, S24, and S25 may satisfy Equation 2 below.

$$p_{max} - p_{min} > 0.2 \times p_{max} \quad \text{(Equation 2)}$$

However, the example embodiment is not limited thereto, and a difference between the maximum arrangement interval $p_{max}$ and the minimum arrangement interval $p_{min}$ in the circumferential direction θ between the plurality of first nanostructures NS or the plurality of second nanostructures NS in any one of the first and second regions S21, S22, S23, S24, and S25 may be less than or equal to 0.2 times the maximum arrangement distance $p_{max}$.

As shown in the graph of FIG. 5, target phases of the nanostructures NS having parameters corresponding to both ends of the first curve a may be 2π and 0, respectively. When incident light of a predetermined wavelength band is incident on a region including a plurality of nanostructures NS arranged along the first curve a, the target phase delay range of the incident light of the predetermined wavelength band may be 0 to 2π.

In addition, among the plurality of first or second nanostructures NS, an arrangement interval p of the plurality of first or second nanostructures NS provided at the same distance from the center point c1 in the circumferential direction θ may be the same. Meanwhile, among the plurality of first or second nanostructures NS, a width w of the plurality of first or second nanostructures NS provided at the same distance from the center point c1 may be the same. Referring to FIG. 6, a plurality of first and second nanostructures NS may be provided on a substrate sub. The plurality of first and second nanostructures NS may include a material having a refractive index greater than that of the substrate sub. However, the example embodiment is not limited thereto, and in some cases, the plurality of first and second nanostructures NS may include a material having a refractive index less than that of the substrate sub. The difference between the refractive index of the substrate sub and the refractive index of the plurality of first and second nanostructures NS may be greater than or equal to about 0.4 and less than or equal to about 3. Also, the substrate sub and the plurality of first and second nanostructures NS may be covered with a protective layer 11. The plurality of first and second nanostructures NS may include a material having a refractive index greater than that of the protective layer 11. However, the example embodiment is not limited thereto, and in some cases, the plurality of first and second nanostructures NS may include a material having a refractive index less than that of the protective layer 11. The difference between the refractive indices of the protective layer 11 and the plurality of first and second nanostructures NS may be greater than or equal to about 0.4 and less than or equal to about 3.

The substrate sub may include any one of glass (e.g., fused silica, BK7, etc.), quartz, polymer (e.g., PMMA, SU-8, etc.), and plastic, and may include a semiconductor substrate. However, the example embodiment is not limited thereto, and the substrate sub may include various materials having a refractive index less than that of the plurality of first and second nanostructure NS. The plurality of first and second nanostructure NS may include at least one of c-Si, p-Si, a-Si, and III-V compound semiconductors (e.g., GaP, GaN, GaAs, etc.), SiC, $TiO_2$, and SiN. However, the example embodiment is not limited thereto, and the plurality of first and second nanostructure NS may include various materials having a refractive index greater than that of the substrate sub and the protective layer 11. Also, the plurality of first and second nanostructure NS may include various materials having a refractive index less than that of the substrate sub and the protective layer 11. The protective layer 11 may include a polymer material, such as SU-8 or PMMA, or a low refractive material, such as $SiO_2$. However, the example embodiment is not limited thereto, and the protective layer 11 may include various materials having a refractive index less than that of the plurality of first and second nanostructure NS. Also, the protective layer 11 may include various materials having a refractive index greater than that of the plurality of first and second nanostructure NS.

In this way, according to the refractive index difference between the plurality of first and second nanostructures NS and the protective layer 11 or the substrate sub, a tendency shown by parameters of the plurality of first and second nanostructures NS may be slightly different. However, the plurality of first and second nanostructures NS included in the meta-lens 100 according to an embodiment, although there may be some differences in the shape of the curve, may have a parameter that follows the tendency of the first curve a.

Referring to FIG. 7, the first region S21 and the plurality of second regions S22, S23, and S24 may be regions in which a target phase with respect to incident light of a predetermined wavelength band changes from 2π to 0 in a direction away from the center point c1 in the radial direction R. In this case, the meta-lens 100 may operate as a convex lens. For example, in the first region S21 or the plurality of second regions S22, S23, and S24, a plurality of first or second nanostructures NS that follow a parameter distribution corresponding to the first curve a shown in FIG. 5 may be arranged. However, the example embodiment is not limited thereto, and when a target phase with respect to incident light of a predetermined wavelength band changes from 0 to 2π in a direction away from the center point c1 in the radial direction R in each of the first region S21 and the plurality of second regions S22, S23, and S24, the meta-lens 100 may operate as a concave lens.

Meanwhile, widths of the first region S21 and the plurality of second regions S22, S23, and S24 in the radial direction R may gradually decrease in a direction away from the center point c1 in the radial direction R. For example, a total width of the first region S21 in the radial direction R may be greater than a total width of the adjacent second region S22 in the radial direction R. However, the example embodiment is not limited thereto, and the widths of the first region S21 and the plurality of second regions S22, S23, and S24 in the radial direction R may gradually increase in a direction away from the center point c1 in the radial direction R. Also, the widths of the first region S21 and the plurality of second regions S22, S23, S24 in the radial direction R may irregularly change in a direction away from the center point c1 in the radial direction R. Furthermore, the widths of the first region S21 and the plurality of second regions S22, S23, and S24 in the radial direction R may be the same in a direction away from the center point c1 in the radial direction R.

Referring to FIG. 8, a plurality of nanostructures ns1, ns2, ns3, ns4, and ns5 included in any one of the first region S21 and the plurality of second regions S22, S23, S24, and S25 may be distributed according to the first rule or the second rule described above. For example, a plurality of nanostructures ns1 may be disposed on a first radius r1. For example, a plurality of nanostructures ns2 may be disposed on a second radius r2 that is greater than the first radius r1. For example, a plurality of nanostructures ns3 may be disposed on a third radius r3 that is greater than the second radius r2. For example, a plurality of nanostructures ns4 may be disposed on a fourth radius r4 that is greater than the third radius r3. For example, a plurality of nanostructures ns5 may be disposed on a fifth radius r5 that is greater than the fourth radius r4.

Also, each of the plurality of nanostructures ns1, ns2, ns3, ns4, and ns5 may be disposed in a unit region having a width equal to first to fifth arrangement intervals P1, P2, P3, P4, and P5 in a circumferential direction, respectively. For example, the plurality of nanostructures ns1 disposed on the first radius r1 may be disposed in a unit region having a width equal to the first arrangement interval P1 in the circumferential direction. For example, the plurality of nanostructures ns2 disposed on the second radius r2 may be disposed in a unit region having a width equal to the second arrangement interval P2 in the circumferential direction. For example, the plurality of nanostructures ns3 disposed on the third radius r3 may be disposed in a unit region having a width equal to the third arrangement interval P3 in the circumferential direction. For example, the plurality of nanostructures ns4 disposed on the fourth radius r4 may be disposed in a unit region having a width equal to the fourth arrangement interval P4 in the circumferential direction. For example, the plurality of nanostructures ns5 disposed on the fifth radius r5 may be disposed in a unit region having a width equal to the fifth arrangement interval P5 in the circumferential direction. In FIG. 8, unit regions are shown in a square shape, and thus, the plurality of nanostructures ns1, ns2, ns3, ns4, and ns5 are arranged in a square lattice shape, but the example embodiment is not limited thereto. For example, the unit regions may have a regular hexagonal shape, and accordingly, the plurality of nanostructures ns1, ns2, ns3, ns4, and ns5 may be arranged in a hexagonal lattice shape. Furthermore, the plurality of nanostructures ns1, ns2, ns3, ns4, and ns5 may be arranged in various shapes of lattice other than square lattice shape and regular hexagon lattice shape.

As described above, widths w1, w2, w3, w4, and w5 of the plurality of nanostructures ns1, ns2, ns3, ns4, ns5 may be changed in one direction as a distance increases in the radial direction R. For example, the widths w1, w2, w3, w4, and w5 of the plurality of nanostructures ns1, ns2, ns3, ns4, and ns5 may decrease as a distance increases in the radial direction R. For example, the plurality of nanostructures ns1, ns2, ns3, ns4, and ns5 may be arranged to satisfy a condition of w1>w2>w3>w4>w5. In this case, the meta-lens 100 may operate as a convex lens. On the other hand, when plurality of nanostructures ns1, ns2, ns3, ns4, ns5 are arranged to satisfy a condition of w5>w4>w3>w2>w1, the meta-lens 100 may operate as a concave lens. Also, the first to fifth arrangement intervals P1, P2, P3, P4, and P5 in the circumferential direction θ between the plurality of nanostructures ns1, ns2, ns3, ns4, and ns5 may decrease and then increase as the distance increases in the radial direction R. For example, a plurality of nanostructures ns1, ns2, ns3, ns4, and ns5 may be disposed so as to satisfy a condition of P1>P2>P3 and P5>P4>P3.

Furthermore, the plurality of nanostructures ns1 having the first arrangement interval P1 in the circumferential direction θ and positioned on the first radius r1 and the plurality of nanostructures ns2 having the second arrangement interval P2 in the circumferential direction θ, positioned on the second radius r2 and being adjacent to the plurality of nanostructures ns1 in a direction away from the first radius r1 in the radial direction R, may be disposed to satisfy Equation 3 below.

$$r2-r1=(P1+P2)/2 \quad \text{(Equation 3)}$$

When the plurality of nanostructures ns1, ns2, ns3, ns4, and ns5 are disposed to satisfy Equation 3, the diffraction efficiency of the meta-lens 100 may be increased due to a compact arrangement. The same rule as in Equation 3 may also be applied between the plurality of nanostructures ns2 and the plurality of nanostructures ns3. The same rule as in Equation 3 may also be applied between the plurality of nanostructures ns3 and the plurality of nanostructures ns4. The same rule as in Equation 3 may also be applied between the plurality of nanostructures ns4 and the plurality of nanostructures ns5. However, the example embodiment is not limited thereto, and when the plurality of nanostructures ns1, ns2, ns3, ns4, and ns5 are arranged in a hexagonal lattice shape, the plurality of nanostructures ns1 and the plurality of nanostructures ns2 may be arranged to satisfy Equation 4 below.

$$r2-r1=((P1+P2)/2)^{\wedge}(3/2) \quad \text{(Equation 4)}$$

Referring to FIG. 9, each fill factor of the plurality of nanostructures ns1, ns2, ns3, ns4, and ns5 with respect to a unit region may be about 25% to about 60%. However, the example embodiment is not limited thereto, and each fill factor of the plurality of nanostructures ns1, ns2, ns3, ns4, and ns5 may have a value of about 10% or less. For example, each fill factor of the plurality of nanostructures ns1, ns2, ns3, ns4, and ns5 may have a value of 3%, 5%, or 10%. As shown in FIG. 9, when the plurality of nanostructures ns1, ns2, ns3, ns4, and ns5 are square columns, the fill factor of the plurality of nanostructures ns1, ns2, ns3, ns4, and ns5 may be defined as '$w^2/P^2$'.

Figure 10:
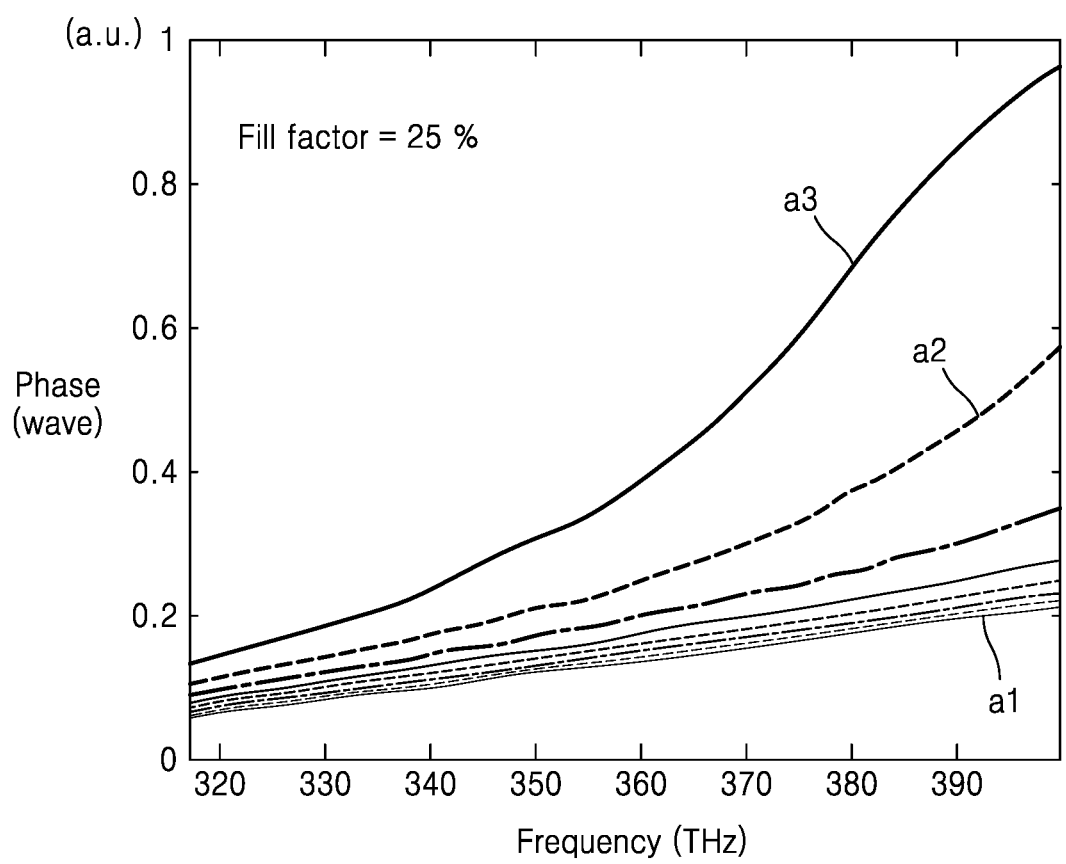
FIG. 10 is a graph showing a phase change transition according to an operating frequency of the meta-lens of FIG. 4 including a plurality of nanostructures having different arrangement intervals from each other according to an embodiment.
Figure 11:
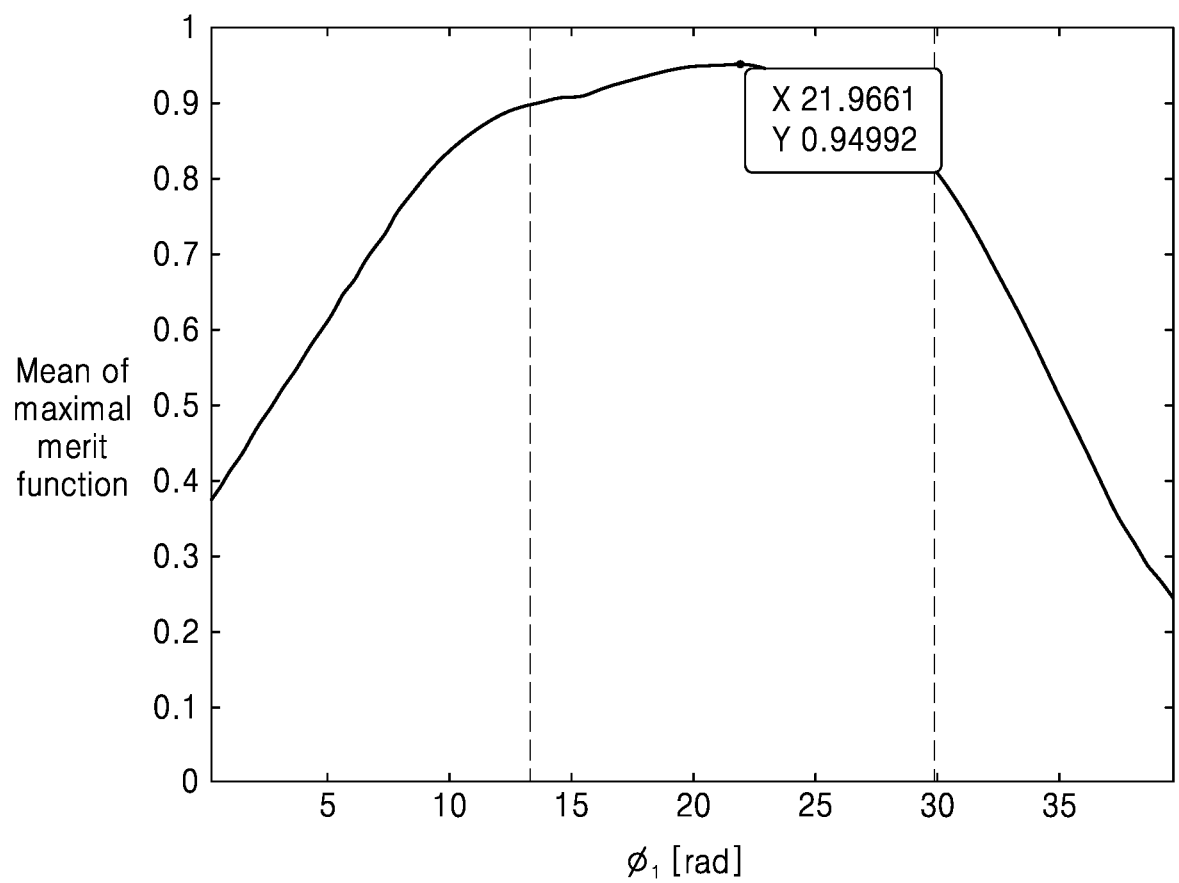
FIG. 11 is a graph briefly showing a transition of diffraction efficiency with respect to a linear term coefficient of a plurality of nanostructures that may be applied to the meta-lens of FIG. 4 according to an embodiment.
Figure 12:
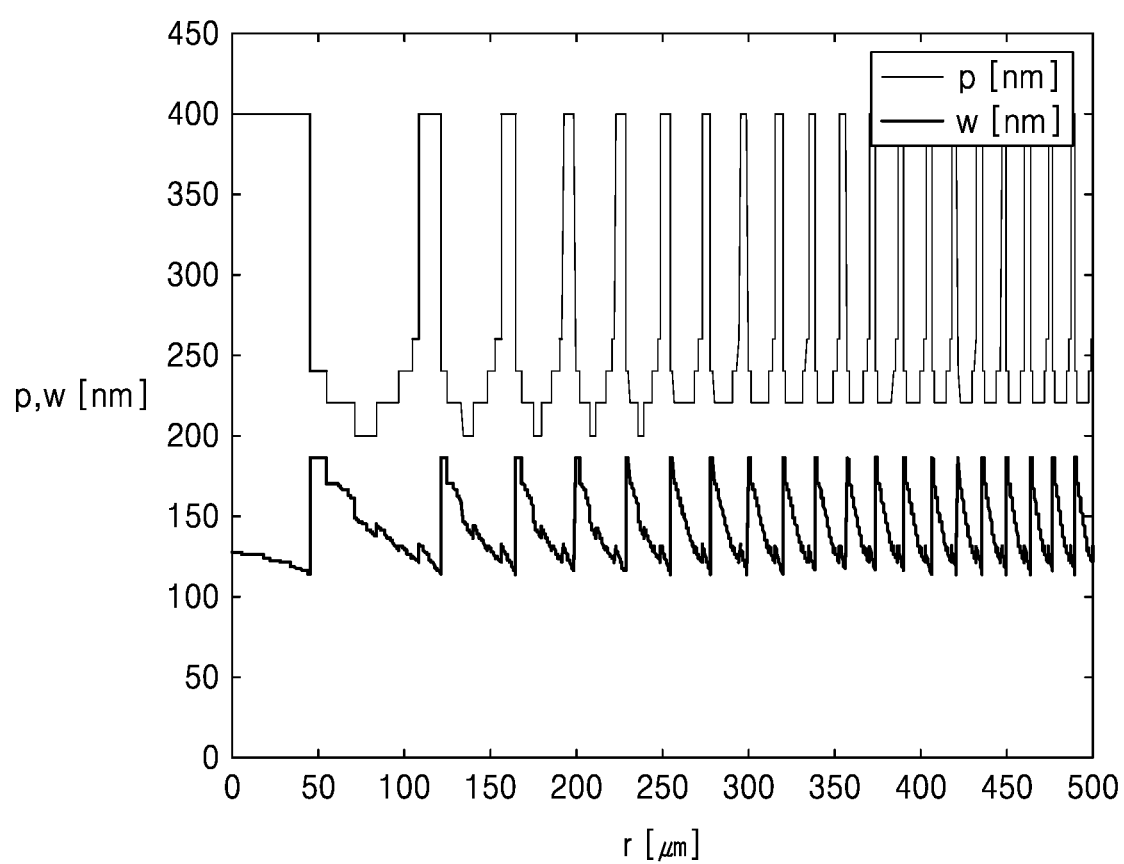
FIG. 12 is a graph briefly showing a distribution of parameters of a plurality of nanostructures that may be applied to the meta-lens of FIG. 4 according to an embodiment.

FIG. 10 is a graph showing a phase delay transition according to an operating frequency of the meta-lens 100 of FIG. 4 including a plurality of nanostructures NS having different arrangement intervals from each other. FIG. 11 is a graph briefly showing a transition of diffraction efficiency with respect to a linear term coefficient φ1 of the plurality of nanostructures NS that may be applied to the meta-lens 100 of FIG. 4. FIG. 12 is a graph briefly showing the distribution of parameters of the plurality of nanostructures NS that may be applied to the meta-lens of FIG. 4.

A first curve a1, a second curve a2, and a third curve a3 shown in FIG. 10 are curves showing the phase delay transition according to operating frequencies of the plurality of nanostructures NS having an arrangement interval of 200 nm, 550 nm, and 600 nm, respectively. Curves between the first curve a1 and the second curve a2 are curves showing the phase delay transition according to operating frequencies of the plurality of nanostructures NS when the arrangement interval is included in a range of 200 nm to 550 nm. FIG. 10 shows results when the fill factor of the plurality of nanostructures NS is about 25%.

Referring to FIG. 10, as the arrangement interval of the plurality of nanostructures NS changes, the phase delay transition according to an operating frequency may also be changed. As described above, the phase change function φ(ω) for a frequency of light in a predetermined wavelength band may be developed as in Equation 1 shown above. Referring to FIG. 10, as the arrangement interval of the plurality of nanostructures NS changes, a linear term coefficient φ1 that may correspond to a rate of change of curves, such as the first curve a1, the second curve a2, and the third curve a3 may also be changed.

Referring to FIG. 11, the diffraction efficiency with respect to light incident to the plurality of nanostructures NS is highest when the linear term coefficient φ1 has a value of about 22. In other words, when the linear term coefficient φ1 has a value of about 22, a phase change in a range of 0 to 2π with respect to incident light may be implemented by controlling parameters (e.g., width, arrangement interval) of a plurality of nanostructures NS.

Referring to FIG. 12, parameters of the plurality of nanostructures NS that may implement a phase change in a range of 0 to 2π with respect to incident light of a predetermined wavelength band while having a value of the linear term coefficient φ1 of about 22 may be determined. The graph of FIG. 12 shows a tendency of repeating a specific section in which an arrangement interval p of the plurality of nanostructures NS decreases and then increases and a width w decreases. Parameters of the plurality of nanostructures NS that show the tendency are substantially the same as the distribution of the plurality of nanostructures NS shown in FIG. 8.

Figure 13:
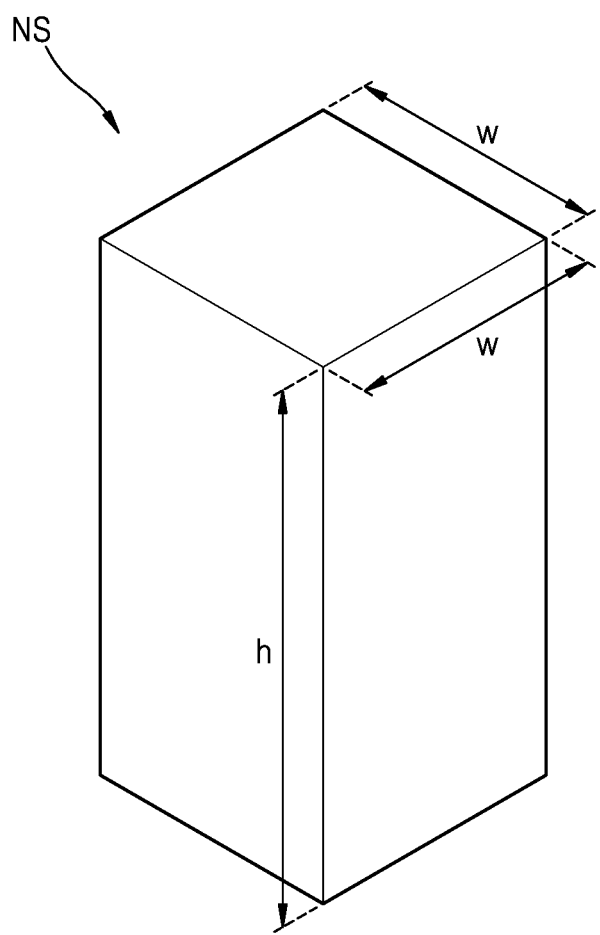
FIG. 13 is a schematic diagram of a structure of a plurality of nanostructures included in the meta-lens of FIG. 4 according to an embodiment.
Figure 14:
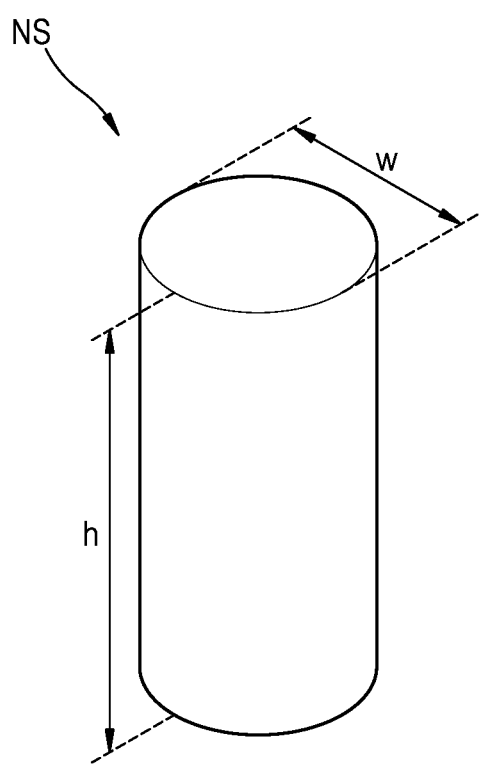
FIG. 14 is a schematic diagram of a structure of a plurality of nanostructures included in the meta-lens of FIG. 4 according to an embodiment.

FIG. 13 is a schematic diagram of a structure of a plurality of nanostructures NS included in the meta-lens 100 of FIG. 4. FIG. 14 is a schematic diagram of a structure of the plurality of nanostructures included in the meta-lens 100 of FIG. 4.

Referring to FIG. 13, the plurality of nanostructures NS may include a square column having a width w and a height h. However, the example embodiment is not limited thereto, and the plurality of nanostructures NS may have various shapes other than the square column. For example, as shown in FIG. 14, the plurality of nanostructures NS may include a cylinder having a diameter w and a height h. Meanwhile, cross-sections of the plurality of nanostructures NS may have symmetry. For example, a cross section viewed from the top of the plurality of nanostructures NS may be a cross section having symmetry, such as a square, a regular hexagon, a circle, etc. However, the example embodiment is not limited thereto, and the cross-section viewed from the top of the plurality of nanostructures NS may include a cross-section having asymmetry, such as an ellipse, a rectangular parallelepiped, etc.

The cross-sectional shape of the plurality of nanostructures NS may be different from each other in at least two regions of the first region S21 and the plurality of second regions S22, S23, S24, and S25. Furthermore, the height h of the plurality of nanostructures NS may be different from each other in at least two regions of the first region S21 and the plurality of second regions S22, S23, S24, and S25.

Although not shown in FIGS. 13 and 14, as shown in FIG. 6, a plurality of nanostructures NS may be provided on the substrate sub (refer to FIG. 6) and covered with the protective layer 11 (refer to FIG. 6). In this case, when the refractive index and the height of the plurality of nanostructures NS are respectively $n_{post}$ and h, the refractive index of the protective layer 11 is $n_{clad}$, and the central wavelength of incident light in a predetermined wavelength band is λ, a plurality of nanostructure NS may be formed to satisfy Equation 5 below.

$$3/2 \times \lambda / (n_{post} - n_{clad}) \leq h \quad \text{(Equation 5)}$$

When a plurality of nanostructures NS are formed to satisfy Equation 5 as above, the first-order diffraction efficiency of the meta-lens 100 may be greater than 80%.

Furthermore, a plurality of nanostructures NS may be formed to satisfy Equation 6 or Equation 7 below.

$$2 \times \lambda / (n_{post} - n_{clad}) \leq h \quad \text{(Equation 6)}$$

$$3 \times \lambda / (n_{post} - n_{clad}) \leq h \quad \text{(Equation 7)}$$

When a plurality of nanostructures NS are formed to satisfy Equation 6 as described above, the first-order diffraction efficiency of the meta-lens 100 may be greater than 90%. Furthermore, when a plurality of nanostructures NS is formed to satisfy Equation 7, the first-order diffraction efficiency of the meta-lens 100 may be greater than 95%. Equations 5-7 are provided as examples and the relationships between $n_{post}$, $n_{clad}$, h, and λ may be freely determined as appropriate depending on an embodiment.

Figure 15:
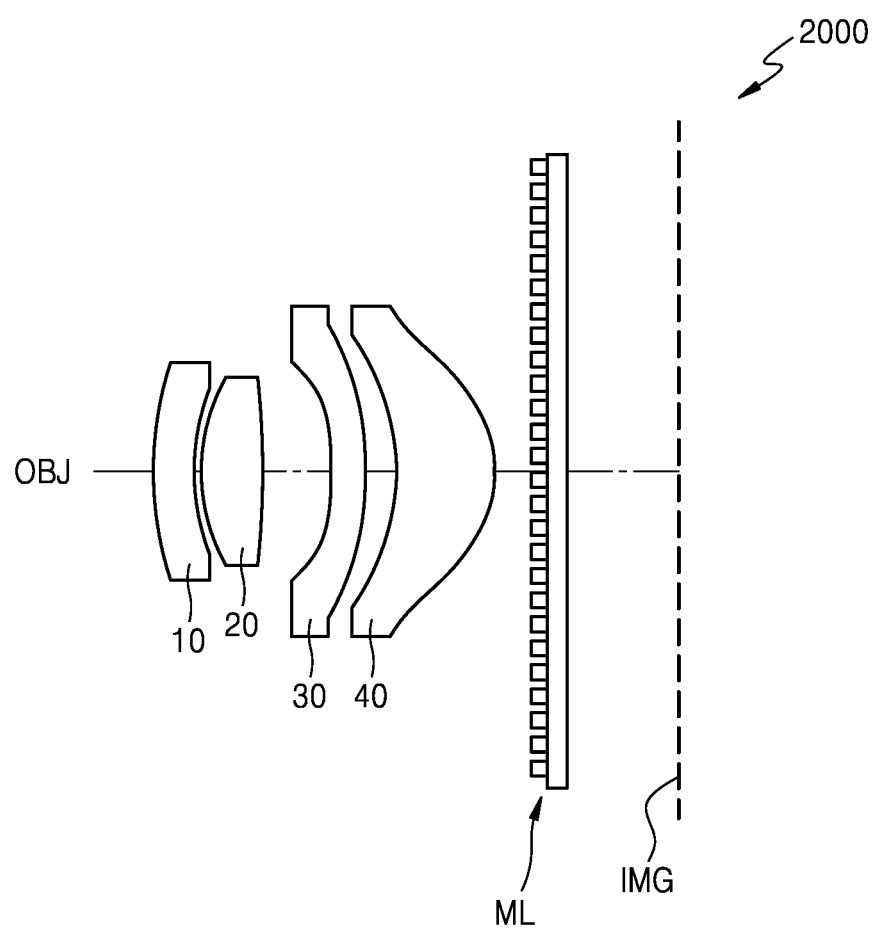
FIG. 15 shows a schematic optical arrangement of an image capturing lens according to an embodiment.

FIG. 15 shows a schematic optical arrangement of an image capturing lens 2000 according to an embodiment.

The image capturing lens 2000 includes a first lens 10, a second lens 20, a third lens 30, a fourth lens 40, and a fifth lens ML, which are sequentially arranged in the stated order from an object OBJ. The first to fourth lenses 10, 20, 30, and 40 are general refractive lenses in which a curved surface is applied to a light incident surface and/or a light exit surface, and the fifth lens ML is a flat-plate type meta-lens. The fifth lens ML may include the meta-lens 100 described above or a modified version of the meta-lens 100.

The fifth lens (meta-lens) ML may have an Abbe number capable of compensating for chromatic aberration caused by the first to fourth lenses 10, 20, 30, and 40. The meta-lens ML may have a negative Abbe number for effective chromatic aberration compensation.

The meta-lens ML may be set to mainly compensate for chromatic aberration and to have almost no refractive power. For example, the meta-lens ML may have a very weak, close to zero, positive or negative refractive power, and thus, may have a very long focal length.

A focal length fm of the meta-lens ML and a focal length f1 of the remaining first to fourth lenses 10, 20, 30 and 40 may satisfy Equation 8 below.

$$|fm| > |f1| \quad \text{(Equation 8)}$$

Also, the focal length fm of the meta-lens ML may be greater than a focal length |f| of a lens representing the greatest focal length among the first to fourth lenses 10, 20, 30, and 40. That is, among lenses constituting the image capturing lens 2000, the meta-lens ML may be configured to have the weakest refractive power.

Setting of the meta-lens ML as described above may represent a design advantage in that the meta-lens ML has little effect on the remaining performance of an image capturing lens including only refractive lenses of the related art and may be added only for compensating for chromatic aberration.

Figure 16:
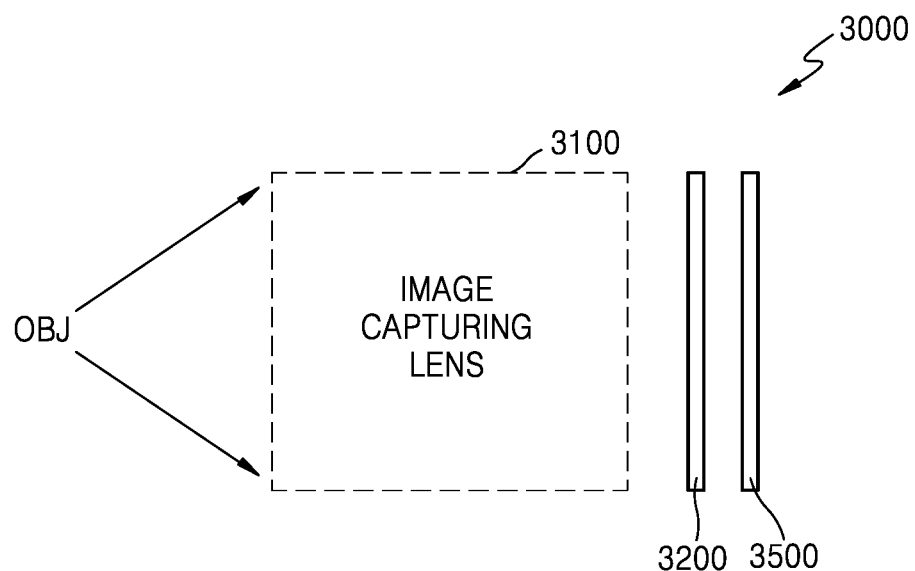
FIG. 16 shows a schematic optical arrangement of an image capturing device according to an embodiment.

FIG. 16 shows a schematic optical arrangement of an image capturing device 3000 according to an embodiment.

The image capturing device 3000 may include an image capturing lens 3100 and an image sensor 3500 that converts an optical image of an object OBJ formed by the image capturing lens 3100 into an electrical signal. A cover glass 3200 may be arranged between the image capturing lens 3100 and the image sensor 3500, and an infrared cut filter may be coated on the cover glass 3200.

The image sensor 3500 is arranged on an image surface where an optical image of the subject OBJ is formed by the image capturing lens 3100. The image sensor 3500 may include an array of a CCD, CMOS, or photodiode that senses light to generate an electric signal. The image sensor 3500 is not limited thereto.

The image capturing lens 3100 may include one or more meta-lenses. As shown in FIG. 15, the image capturing lens 3100 may have any configuration including a meta-lens. As a meta-lens provided in the image capturing lens 3100 may include the meta-lens 100 described above or a modified version of the meta-lens 100. The meta-lens may effectively compensate for chromatic aberration while performing in a wide wavelength band of a visible light band, and thus, the performance of the image capturing device 3000 may be improved.

Figure 17:
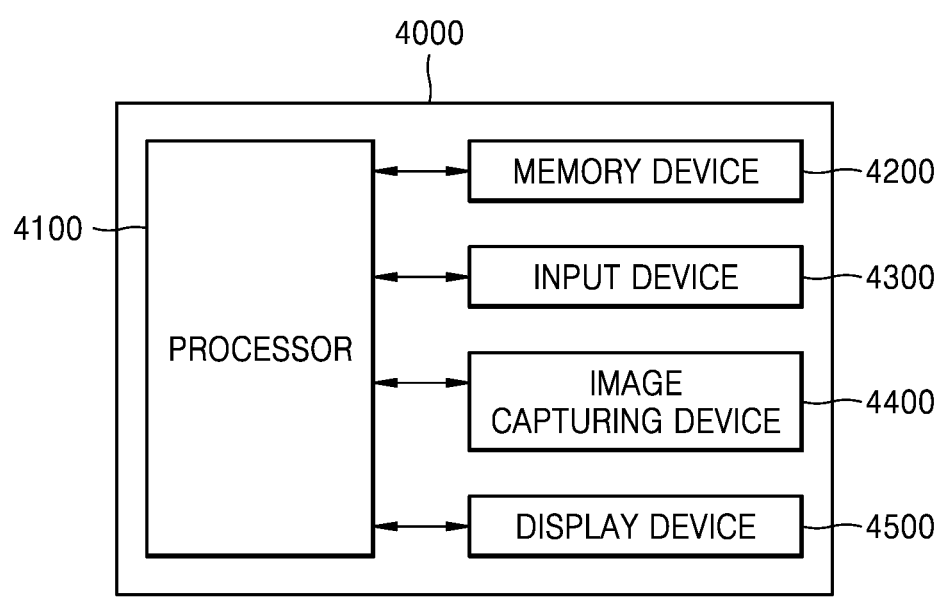
FIG. 17 is a schematic diagram of a structure of an electronic apparatus according to an embodiment.

FIG. 17 is a schematic diagram of a structure of an electronic apparatus 4000 according to an embodiment.

Referring to FIG. 17, the electronic apparatus 4000 may include a processor 4100 that controls an overall operation of the electronic apparatus 4000, a memory device 4200 capable of storing various programs and data, an input device 4300 for receiving a data signal from the outside of the electronic apparatus 4000, and an image capturing device 4400 for obtaining image data from the outside, and a display device 4500 that provides a predetermined image to the user. The electronic apparatus 4000 may include, for example, any one of a mobile device, such as a smartphone, an augmented reality (AR) device, and a virtual reality (VR) device.

The processor 4100 may control an overall operation of the electronic apparatus 4000 by executing one or more instructions of a program stored in the memory device 4200. For example, the processor 4100 may control the image capturing device 4400 to acquire image data based on a predetermined data signal from the input device 4300. Furthermore, the processor 4100 may process image data acquired from the image capturing device 4400 and store the processed image data in the memory device 4200. Also, the processor 4100 may control a display device 4500 to provide a predetermined image to the user.

For example, the processor 4100 may include one processor core (Single Core) or a plurality of processor cores (Multi-Core). For example, the processor 4100 may include at least one of a central processing unit (CPU), a microprocessor, a graphic processing unit (GPU), application specific integrated circuits (ASICs), digital signal processors (DSPs), digital signal processing devices (DSPDs), programmable logic devices (PLDs), and field programmable gate arrays (FPGAs), but the example embodiment is not limited thereto.

The memory device 4200 may store various programs that may be executed by the processor 4100. Furthermore, the memory device 4200 may store image data acquired by the image capturing device 4400. For example, the memory device 4200 may include a volatile memory, such as a DRAM or an SRAM. Alternatively, the memory device 4200 may include a nonvolatile memory, such as a PRAM, an MRAM, an ReRAM, or a NAND flash memory. Furthermore, the memory device 4200 may include a hard disk drive (HDD), a solid state drive (SDD), etc.

The input device 4300 may receive a predetermined data signal from outside (for example, a user) of the electronic apparatus 4000. For example, the input device 4000 may include at least one of a touch panel, a physical button, a voice recognition device, and a motion recognition device. For example, when the electronic apparatus 4000 is a mobile device, such as a smartphone, a touch panel as the input device 4000 may be combined with the display device 4500. However, the example embodiment is not limited thereto, and the input device 4300 may include various devices for receiving a predetermined data signal from a user.

The image capturing device 4400 may acquire image data with respect to an image outside the electronic apparatus 4000. For example, the image capturing device 4400 may be substantially the same as the image capturing device 3000 of FIG. 16. Accordingly, the image capturing device 4400 may include an image capturing lens employing the meta-lens 100 of FIG. 4 or a modified version thereof. For example, when the electronic apparatus 4000 is an AR device or a VR device, the image capturing device 4400 may be included in an eye tracking device that tracks the location of the user's pupil. The display device 4500 may provide a predetermined image to a user. For example, the display device 4500 may provide image data acquired by the image capturing device 4400 to a user as an image. For example, the display device 4500 may include a liquid crystal on silicon (LCoS) device, a liquid crystal display (LCD) device, an organic light emitting diode (OLED) display device, and a digital micromirror device (DMD), and may include a next-generation display device, such as Micro LED, QD (quantum dot) LED, etc.

For example, when the electronic apparatus 4000 is a mobile device, such as a smartphone, the display device 4500 may be a single device having a predetermined area for providing an image to a user. On the other hand, when the electronic apparatus 4000 is an AR device or a VR device, the display device 4500 may be configured in plural to project different virtual images to both eyes.

The electronic apparatus 4000 may be, for example, any one of a mobile device, such as a smartphone, an AR device, and a VR device. However, the example embodiment is not limited thereto, that is, the electronic apparatus 4000 may include various types of electronic apparatuses including the processor 4100 that controls an overall operation of the electronic apparatus 4000 and an image capturing device 4400 that is controlled by the processor 4100 to obtain image data from the outside. Furthermore, the electronic apparatus 4000 may further include additional components, such as a communication module and various sensors besides the processor 4100, the memory device 4200, the input device 4300, the imaging device 4400, and the display device 4500 shown in FIG. 17.

According to an embodiment of the inventive concept, a thin lens may be implemented by using a plurality of nanostructures, and a meta-lens that operates with respect to a wide wavelength bandwidth may be provided through appropriate arrangement of a plurality of nanostructures.

Furthermore, an image capturing lens, an image capturing device, and an electronic apparatus employing the meta-lens may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A meta-lens comprising: a first region including a plurality of first nanostructures that are two-dimensionally arranged in a circumferential direction and a radial direction based on a center point, wherein a positional arrangement of the plurality of first nanostructures is determined according to a first rule; and a plurality of second regions surrounding the first region and including a plurality of second nanostructures that are two-dimensionally arranged in the circumferential direction and the radial direction based on the center point, wherein a positional arrangement of the plurality of second nanostructures is determined according to a second rule, wherein each of the first rule and the second rule has parameters w and p, w denoting a width of each of the plurality of first nanostructures or the plurality of second nanostructures and p denoting an arrangement interval in the circumferential direction between the plurality of first nanostructures or the plurality of second nanostructures, wherein a region, in which a section satisfying $\Delta w \times \Delta p > 0$ and a section satisfying $\Delta w \times \Delta p < 0$ are included, is formed and extends in the radial direction in the first region and any one of the plurality of second regions, wherein when an arrangement interval in the circumferential direction of a plurality of nanostructures positioned at a first radius r1 is p1 and an arrangement interval in the circumferential direction between a plurality of nanostructures positioned at a second radius r2 adjacent to the first radius r1 in a direction away from the center point in the radial direction is p2, one of the following two conditions is satisfied:

$$r2-r1=(p1+p2)/2 \text{ or } r2-r1=\{(p1+p2)/2\}/\wedge(3/2);$$

wherein the section satisfying $\Delta w \times \Delta p < 0$ indicates that a change in w and a change in p for adjacent nanostructures of the plurality of first nanostructures or the plurality of second nanostructures is inversely proportional; and wherein the section satisfying Δw×Δp>0 indicates that the change in w and the change in p for adjacent nanostructures of the plurality of first nanostructures or the plurality of second nanostructures is directly proportional.

2. The meta-lens of claim 1, wherein the plurality of first nanostructures and the plurality of second nanostructures are arranged to have a polar symmetry as a whole.

3. The meta-lens of claim 2, wherein
the first rule and the second rule comprise a rule according to which the width w of the plurality of first nanostructures or the plurality of second nanostructures increases or decreases as a distance from the center point increases in the radial direction, and
the arrangement interval p in the circumferential direction between the plurality of first nanostructures or the plurality of second nanostructures decreases and then increases as the distance from the center point increases in the radial direction.

4. The meta-lens of claim 3, wherein a maximum arrangement interval $p_{max}$ and a minimum arrangement interval $p_{min}$ in the circumferential direction between the plurality of first nanostructures or the plurality of second nanostructures satisfy the following condition:

$$p_{max} - p_{min} \geq 0.2 \times p_{max}.$$

5. The meta-lens of claim 1, wherein the first rule and the second rule comprise a rule according to which arrangement intervals p in the circumferential direction between a plurality of nanostructures arranged apart from the center point by a radius of a same size, from among the plurality of first nanostructures or the plurality of second nanostructures, are the same.

6. The meta-lens of claim 1, wherein the first rule and the second rule comprise a rule according to which widths w of a plurality of nanostructures arranged apart from the center point by a radius of a same size, from among the plurality of first nanostructures or the plurality of second nanostructures, are the same.

7. The meta-lens of claim 1, wherein a target phase change range with respect to light of a predetermined wavelength band incident on the meta-lens in each of the first region and the plurality of second regions is from 0 to 2π.

8. The meta-lens of claim 7, wherein the predetermined wavelength band of light comprises a visible light wavelength band.

9. The meta-lens of claim 1, wherein the first region has a circular shape, and each of the plurality of second regions have a concentric ring shape.

10. The meta-lens of claim 1, wherein a width of the first region and each of the plurality of second regions in the radial direction decreases as a distance from the center point increases in the radial direction.

11. The meta-lens of claim 1, further comprising a substrate on which the plurality of first nanostructures and the plurality of second nanostructures are provided, wherein the plurality of first nanostructures and the plurality of second nanostructures comprise a material having a refractive index greater than a refractive index of the substrate.

12. The meta-lens of claim 11, wherein a difference between the refractive index of the substrate and a respective refractive index of the plurality of first nanostructures and the plurality of second nanostructures is greater than or equal to about 0.4 and less than or equal to about 3.

13. The meta-lens of claim 11, further comprising a protective layer covering the substrate and the plurality of first nanostructures and the plurality of second nanostructures.

14. The meta-lens of claim 13, wherein a difference between a refractive index of the protective layer and a respective refractive index of the plurality of first nanostructures and the plurality of second nanostructures is greater than or equal to about 0.4 and less than or equal to about 3.

15. The meta-lens of claim 13, wherein when a respective refractive index and a respective height of the plurality of first nanostructures and the plurality of second nanostructures are respectively $n_{post}$ and h, a refractive index of the protective layer is $n_{clad}$, and a center wavelength of a predetermined wavelength band of light incident on the meta-lens is λ, the following condition is satisfied:

$$3/2 \times \lambda / (n_{post} - n_{clad}) \leq h.$$

16. The meta-lens of claim 15, wherein when an arrangement interval in the circumferential direction between the plurality of first nanostructures or the plurality of second nanostructures is p, the following condition is satisfied:

$$p < \lambda/2.$$

17. The meta-lens of claim 1, wherein heights of the plurality of first nanostructures and the plurality of second nanostructures are different in at least two regions of the first region and the plurality of second regions.

18. The meta-lens of claim 1, wherein a fill factor of each of the plurality of first nanostructures or the plurality of second nanostructures with respect to a unit region having a width equal to an arrangement interval p in the circumferential direction between the plurality of first nanostructures or the plurality of second nanostructures is in a range of about 25% to about 60%.

19. The meta-lens of claim 1, wherein a cross-section of the plurality of first nanostructures or the plurality of second nanostructures has a symmetric shape.

20. An image capturing lens comprising:
a meta-lens according to claim 1; and
at least one refractive lens having a light incident surface and a light exit surface and at least one of the light incident surface and the light exit surface is a curved surface.

21. An image capturing device comprising:
the image capturing lens of claim 20; and
an image sensor configured to convert an optical image formed by the image capturing lens into an electrical signal.

22. An electronic apparatus comprising:
the image capturing device of claim 21; and
a processor configured to control an operation of the image capturing device.

23. A meta-lens comprising: a first region including a plurality of first nanostructures that are two-dimensionally arranged in a circumferential direction and a radial direction based on a center point, wherein a positional arrangement of the plurality of first nanostructures is defined according to a first rule; a plurality of second regions surrounding the first region and including a plurality of second nanostructures that are two-dimensionally arranged in the circumferential direction and the radial direction based on the center point, wherein a positional arrangement of the plurality of second nanostructures is defined according to a second rule; and
a protective layer covering the plurality of first nanostructures and the plurality of second nanostructures, wherein each of the first rule and the second rule has parameters w and p, w denoting a width of each of the plurality of first nanostructures or the plurality of second nanostructures and p denoting an arrangement interval in the circumferential direction between the plurality of first nanostructures or the plurality of second nanostructures, wherein a region where a section satisfying $\Delta w \times \Delta p > 0$, indicates that the change in w and the change in p for adjacent nanostructures of the plurality of first nanostructures or the plurality of second nanostructures is directly proportional, and a section satisfying $\Delta w \times \Delta p < 0$, indicates that a change in w and a change in p for adjacent nanostructures of the plurality of first nanostructures or the plurality of second nanostructures is inversely proportional, coexist is formed and extends in the radial direction in the first region and any one of the plurality of second regions, wherein when a respective refractive index and a respective height of the plurality of first nanostructures and the plurality of second nanostructures are respectively $n_{post}$ and h, a refractive index of the protective layer is $n_{clad}$, and a center wavelength of a predetermined wavelength band of light incident on the meta-lens is $\lambda$, the following condition is satisfied:

$$3/2 \times \lambda/(n_{post} - n_{clad}) \leq h, \text{ and}$$

wherein when an arrangement interval in the circumferential direction between the plurality of first nanostructures or the plurality of second nanostructures is p, the following condition is satisfied:

$$p < \lambda/2.$$

* * * * *